(12) United States Patent
Dunjic et al.

(10) Patent No.: US 11,467,749 B2
(45) Date of Patent: Oct. 11, 2022

(54) SYSTEM AND METHOD FOR CONDITIONAL DATA TRANSFERS

(71) Applicant: The Toronto-Dominion Bank, Toronto (CA)

(72) Inventors: Milos Dunjic, Oakville (CA); David Samuel Tax, Toronto (CA); Vipul Kishore Lalka, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 207 days.

(21) Appl. No.: 16/781,136

(22) Filed: Feb. 4, 2020

(65) Prior Publication Data

US 2021/0240379 A1    Aug. 5, 2021

(51) Int. Cl.
*G06F 3/06* (2006.01)
*H04L 9/40* (2022.01)
*G06F 9/54* (2006.01)

(52) U.S. Cl.
CPC .......... *G06F 3/0647* (2013.01); *G06F 3/0604* (2013.01); *G06F 3/067* (2013.01); *G06F 9/541* (2013.01); *H04L 63/0869* (2013.01)

(58) Field of Classification Search
None
See application file for complete search history.

(56) References Cited

U.S. PATENT DOCUMENTS 8,738,520 B2 * 5/2014 Runkle ................. G06Q 20/401
705/39

9,384,493 B2    7/2016  Harris et al.
9,390,452 B1    7/2016  Biemer et al.
10,210,518 B2   2/2019  Alnajem
(Continued)

FOREIGN PATENT DOCUMENTS

WO    2019040855 A1    2/2019

OTHER PUBLICATIONS

Fischer et al.: "Smartphones: Not Smart Enough?", Proceedings of the second ACM workshop on Security and privacy in smartphones and mobile devices. ACM, 2012.

*Primary Examiner* — Elias Mamo
(74) *Attorney, Agent, or Firm* — Rowand LLP

(57) ABSTRACT

A system comprises a communications module; a processor coupled to the communications module; and a memory coupled to the processor, the memory storing processor-executable instructions which, when executed by the processor, configure the processor to receive, via the communications module, a transfer instruction for transfer of data from a first data record associated with a transferor to a second data record associated with a recipient, the transfer instruction including a transfer amount and a condition associated with the transfer; send, via the communications module, a notification of the transfer instruction to a computing device associated with the recipient and request permission to obtain contextual data therefrom; when permission is granted, obtain, via the communications module, contextual data from the computing device; determine, based on the contextual data, that the condition associated with the transfer has been satisfied; and in response to determining that the condition associated with the transfer has been satisfied, effect the transfer of data from the first data record to the second data record.

20 Claims, 15 Drawing Sheets

1300

Analyze contextual data to determine a song listened to by the recipient — 1310

Compare the current song to the condition associated with the transfer — 1320

(56) References Cited

U.S. PATENT DOCUMENTS

| | | | |
|---|---|---|---|
| 2010/0174647 A1* | 7/2010 | Kowalchyk | G06Q 20/10 |
| | | | 705/44 |
| 2011/0295722 A1 | 12/2011 | Reisman | |
| 2014/0156435 A1* | 6/2014 | Rahman | G06Q 20/381 |
| | | | 705/21 |
| 2015/0379488 A1 | 12/2015 | Ruff et al. | |
| 2017/0124626 A1* | 5/2017 | Barnett | G06Q 40/02 |
| 2017/0337540 A1 | 11/2017 | Buckman et al. | |
| 2018/0114216 A1 | 4/2018 | Joseph et al. | |
| 2019/0034936 A1 | 1/2019 | Nolan et al. | |
| 2019/0035018 A1 | 1/2019 | Nolan et al. | |
| 2019/0104171 A1 | 4/2019 | McPhee et al. | |
| 2019/0110188 A1 | 4/2019 | Dunjic et al. | |
| 2019/0205872 A1* | 7/2019 | Tourne | G06F 16/219 |
| 2019/0220863 A1 | 7/2019 | Novick et al. | |
| 2020/0393991 A1* | 12/2020 | Kachare | G06F 3/0656 |

* cited by examiner

SYSTEM AND METHOD FOR CONDITIONAL DATA TRANSFERS

TECHNICAL FIELD

The present disclosure relates to electronic data transfers, more particularly, to systems and methods for conditional data transfers.

BACKGROUND

Electronic data transfers are used to transfer data between data records. For example, a transferor may electronically transfer data from their data record to a data record of a recipient.

Electronic transfers of data often only permit the transferor to configure the amount of the transfer, the source of the data, and the recipient.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
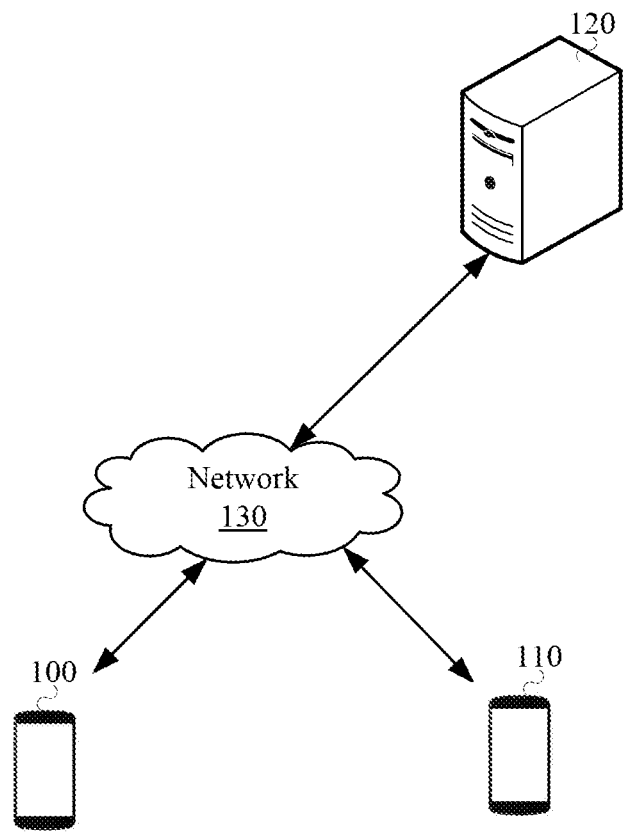
FIG. 1 is a schematic operation diagram illustrating an operating environment of an example embodiment.

Accordingly, in one aspect there is provided a system comprising a communications module; a processor coupled to the communications module; and a memory coupled to the processor, the memory storing processor-executable instructions which, when executed by the processor, configure the processor to receive, via the communications module, a transfer instruction for transfer of data from a first data record associated with a transferor to a second data record associated with a recipient, the transfer instruction including a transfer amount and a condition associated with the transfer; send, via the communications module, a notification of the transfer instruction to a computing device associated with the recipient and request permission to obtain contextual data therefrom; when permission is granted, obtain, via the communications module, contextual data from the computing device; determine, based on the contextual data, that the condition associated with the transfer has been satisfied; and in response to determining that the condition associated with the transfer has been satisfied, effect the transfer of value from the first data record to the second data record.

In one or more embodiments, the processor-executable instructions, when executed by the processor, further configure the processor to hold, within the first data record, the transfer amount until the transfer of data has been effected to the second account.

In one or more embodiments, the contextual data includes mood data and the condition specifies a particular mood of the recipient.

In one or more embodiments, the mood data includes data obtained from an application programming interface (API) associated with a streaming music service, and wherein determining that the condition associated with the transfer has been satisfied includes determining that the recipient has been listening to music associated with the particular mood.

In one or more embodiments, the contextual data includes location data received from the computing device associated with the recipient.

In one or more embodiments, the condition specifies a particular location and the condition is satisfied when the location data indicates that the recipient is at the particular location.

In one or more embodiments, the processor-executable instructions, when executed by the processor, further configure the processor to determine, based on the location data, route information for the recipient; and determine the transfer amount based at least on the route information.

In one or more embodiments, the contextual data includes weather data for a location associated with the recipient.

In one or more embodiments, the contextual data includes biometric data obtained from the computing device associated with the recipient.

In one or more embodiments, the condition is based on a balance in the second account.

In one or more embodiments, the condition is a challenge set by the transferor.

In one or more embodiments, the transfer instruction includes a second condition and a second transfer amount and wherein the amount of transfer value depends on which of the conditions is satisfied.

In one or more embodiments, permission is granted when a mobile application is identified on the computing device associated with the recipient.

According to another aspect there is provided a method comprising receiving, via a communications module, a transfer instruction for transfer of data from a first data record associated with a transferor to a second data record associated with a recipient, the transfer instruction including a transfer amount and a condition associated with the transfer; sending, via the communications module, a notification of the transfer instruction to a computing device associated with the recipient and requesting permission to obtain contextual data therefrom; when permission is granted, obtaining, via the communications module, contextual data from the computing device; determining, based on the contextual data, that the condition associated with the transfer has been satisfied; and in response to determining that the condition associated with the transfer has been satisfied, effecting the transfer of data from the first data record to the second data record.

In one or more embodiments, the method further comprises holding, within the first data record, the transfer amount until the transfer of data has been effected to the second data record.

In one or more embodiments, the contextual data includes mood data and the condition specifies a particular mood of the recipient.

In one or more embodiments, the mood data includes data obtained from an application programming interface (API) associated with a streaming music service, and wherein determining that the condition associated with the transfer has been satisfied includes determining that the recipient has been listening to music associated with the particular mood.

In one or more embodiments, the contextual data includes location data received from the computing device associated with the recipient.

In one or more embodiments, the transfer instruction includes a second condition and a second transfer amount and wherein the amount of transfer value depends on which of the conditions is satisfied.

According to another aspect there is provided a non-transitory computer-readable storage medium storing instructions that when executed by a processor of a computer system cause the computing system to receive, via a communications module, a transfer instruction for transfer of data from a first data record associated with a transferor to a second data record associated with a recipient, the transfer instruction including a transfer amount and a condition associated with the transfer; send, via the communications module, a notification of the transfer instruction to a computing device associated with the recipient and request permission to obtain contextual data therefrom; when permission is granted, obtain, via the communications module, contextual data from the computing device; determine, based on the contextual data, that the condition associated with the transfer has been satisfied; and in response to determining that the condition associated with the transfer has been satisfied, effect the transfer of data from the first data record to the second data record.

According to another aspect there is provided a system comprising a communications module; a processor coupled to the communications module; and a memory coupled to the processor, the memory storing processor-executable instructions which, when executed by the processor, configure the processor to receive, via the communications module, a transfer instruction for transfer of data from a first data record associated with a transferor to a second data record associated with a recipient, the transfer instruction including a transfer amount and a condition associated with the transfer; obtain, via the communications module and from a computing device associated with the recipient, mood data; determine, based on the mood data, that the condition associated with the transfer has been satisfied; and in response to determining that the condition associated with the transfer has been satisfied, effect the transfer of data from the first data record to the second data record.

In one or more embodiments, the condition specifies a particular mood of the recipient.

In one or more embodiments, the mood data includes data obtained from an application programming interface (API) associated with a streaming music service.

In one or more embodiments, determining that the condition associated with the transfer has been satisfied includes determining that the recipient has been listening to music associated with the particular mood.

In one or more embodiments, the mood data includes data obtained from an application programming interface (API) associated with an internet browser.

In one or more embodiments, determining that the condition associated with the transfer has been satisfied includes determining that the recipient has been searching terms or visiting web pages associated with the particular mood.

In one or more embodiments, the mood data includes conversational data obtained from a mobile device associated with the recipient.

In one or more embodiments, the conversational data is obtained from a microphone of the mobile device and wherein determining that the condition associated with the transfer has been satisfied includes determining that the recipient has spoken words associated with the particular mood.

In one or more embodiments, the conversational data is obtained from an application programming interface (API) associated with a messaging service on the mobile device and wherein determining that the condition associated with the transfer has been satisfied includes determining that the recipient has sent messages that include words associated with the particular mood.

In one or more embodiments, the mood data includes weather data based on an approximate location of the recipient.

In one or more embodiments, determining that the condition associated with the transfer has been satisfied includes determining that the weather is associated with the particular mood.

In one or more embodiments, the mood data includes biometric data obtained of the recipient.

In one or more embodiments, the processor-executable instructions, when executed by the processor, further configure the processor to after effecting the transfer of data from the first data record to the second data record, obtain, via the communications module, additional mood data from the computing device associated with the recipient; determine, based on the additional mood data, that a mood of the recipient has changed; and in response to determining that the mood of the recipient has changed, sending, via the communications module, a notification to a computing device associated with the transferor indicating that the mood of the recipient has changed.

According to another aspect there is provided a method comprising receiving, via a communications module, a transfer instruction for transfer of data from a first data record associated with a transferor to a second data record associated with a recipient, the transfer instruction including a transfer amount and a condition associated with the transfer; obtaining, via the communications module, mood data from a computing device associated with the recipient; determining, based on the mood data, that the condition associated with the transfer has been satisfied; and in response to determining that the condition associated with the transfer has been satisfied, effecting the transfer of data from the first data record to the second data record.

In one or more embodiments, the condition specifies a particular mood of the recipient.

In one or more embodiments, the mood data includes data obtained from an application programming interface (API) associated with a streaming music service.

In one or more embodiments, determining that the condition associated with the transfer has been satisfied includes determining that the recipient has been listening to music associated with the particular mood.

In one or more embodiments, the mood data includes data obtained from an application programming interface (API) associated with an internet browser.

In one or more embodiments, determining that the condition associated with the transfer has been satisfied includes determining that the recipient has been searching terms or visiting web pages associated with the particular mood.

In one or more embodiments, the mood data includes conversational data obtained from a computing device associated with the recipient.

In one or more embodiments, the conversational data is obtained from a microphone of the computing device and wherein determining that the condition associated with the transfer has been satisfied includes determining that the recipient has spoken words associated with the particular mood.

In one or more embodiments, the conversational data is obtained from an application programming interface (API) associated with a messaging service on the computing device and wherein determining that the condition associated with the transfer has been satisfied includes determining that the recipient has sent messages that include words associated with the particular mood.

In one or more embodiments, the mood data includes weather data based on an approximate location of the recipient.

In one or more embodiments, determining that the condition associated with the transfer has been satisfied includes determining that the weather is associated with the particular mood.

In one or more embodiments, the mood data includes biometric data obtained of the recipient.

In one or more embodiments, after effecting the transfer of data from the first data record to the second data record, obtaining, via the communications module, additional mood data from the computing device associated with the recipient; determining, based on the additional mood data, that a mood of the recipient has changed; and in response to determining that the mood of the recipient has changed, sending, via the communications module, a notification to a computing device associated with the transferor indicating that the mood of the recipient has changed.

According to another aspect there is provided a non-transitory computer-readable storage medium storing instructions that when executed by a processor of a computer system cause the computing system to receive, via a communications module, a transfer instruction for transfer of data from a first data record associated with a transferor to a second data record associated with a recipient, the transfer instruction including a transfer amount and a condition associated with the transfer; obtain, via the communications module, mood data for the recipient; determine, based on the mood data, that the condition associated with the transfer has been satisfied; and in response to determining that the condition associated with the transfer has been satisfied, effect the transfer of data from the first data record to the second data record.

According to another aspect there is provided a system comprising a communications module; a processor coupled to the communications module; and a memory coupled to the processor, the memory storing processor-executable instructions which, when executed by the processor, configure the processor to receive, via the communications module, a transfer instruction for transfer of data from a first data record associated with a transferor to a second data record associated with a recipient, the transfer instruction including a condition associated with the transfer; obtain, via the communications module and from a computing device associated with the recipient, location data; determine, based on the location data, that the condition associated with the transfer has been satisfied; in response to determining that the condition associated with the transfer has been satisfied, determine, using the location data, route information for the recipient and calculate a transfer amount based at least on the route information; and effect the transfer data at the determined transfer amount from the first data record to the second data record.

In one or more embodiments, the condition specifies a particular location.

In one or more embodiments, the route information includes a starting location.

In one or more embodiments, the route information includes a travel path from the starting location to the particular location.

In one or more embodiments, the processor-executable instructions, when executed by the processor, further configure the processor to determine, based on the route information, a distance travelled by the recipient from the starting location to the particular location.

In one or more embodiments, the processor-executable instructions, when executed by the processor, further configure the processor to determine, based on the route information, a time travelled by the recipient from the starting location to the particular location.

In one or more embodiments, the processor-executable instructions, when executed by the processor, further configure the processor to determine a mode of transportation travelled by the recipient based on the route information.

In one or more embodiments, determining the mode of transportation includes comparing the route information to a map stored in a database that includes at least public transit route information.

In one or more embodiments, the mode of transportation includes one of a car, a taxi, a ride sharing service, a bus, a train, light rail transit, a streetcar and a trolley.

In one or more embodiments, the transfer amount is further based at the mode of transportation.

According to another aspect there is provided a method comprising receiving, via a communications module, a transfer instruction for transfer of data from a first data record associated with a transferor to a second data record associated with a recipient, the transfer instruction including a condition associated with the transfer; obtaining, via the communications module, location data for the recipient; determining, based on the location data, that the condition associated with the transfer has been satisfied; in response to determining that the condition associated with the transfer has been satisfied, determining route information for the recipient and calculate a transfer amount based at least on the route information; and effecting the transfer of data at the determined transfer amount from the first data record to the second data record.

In one or more embodiments, the condition specifies a particular location.

In one or more embodiments, the route information includes a starting location.

In one or more embodiments, the route information includes a travel path from the starting location to the particular location.

In one or more embodiments, the method further comprises determining, based on the route information, a distance travelled by the recipient from the starting location to the particular location.

In one or more embodiments, the method further comprises determining, based on the route information, a time travelled by the recipient from the starting location to the particular location.

In one or more embodiments, the method further comprises determining a mode of transportation travelled by the recipient based on the route information.

In one or more embodiments, determining the mode of transportation includes comparing the route information to a map stored in a database that includes at least public transit route information.

In one or more embodiments, the mode of transportation includes one of a car, a taxi, a ride sharing service, a bus, a train, light rail transit, a streetcar and a trolley.

In one or more embodiments, the transfer amount is further based at the mode of transportation.

According to another aspect there is provided a non-transitory computer-readable storage medium storing instructions that when executed by a processor of a computer system cause the computing system to receive, via a communications module, a transfer instruction for transfer of data from a first data record associated with a transferor to a second data record associated with a recipient, the transfer instruction including a condition associated with the transfer; obtain, via the communications module, location data for the recipient; determine, based on the location data, that the condition associated with the transfer has been satisfied; in response to determining that the condition associated with the transfer has been satisfied, determine route information for the recipient and calculate a transfer amount based at least on the route information; and effect the transfer of data at the determined transfer amount from the first data record to the second data record.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As shown, computing devices 100, 110 and server 120 communicate via a network 130. Computing device 100 may be referred to as a transferor computing device 100 and may be associated with a transferor of value. Computing device 110 may be referred to as a recipient computing device 110 and may be associated with a recipient of value.

The server 120 may be referred to as a data transfer server and may be configured to transfer data between data records in a database. The server 120 may maintain data records for a plurality of users. In at least some embodiments, the server 120 is a value transfer server or financial institution server which may maintain customer bank accounts. That is, the server 120 may maintain a database that includes various data records. A data record may, for example, reflect an amount of value stored in a particular account associated with a user.

While FIG. 1 illustrates a single server 120, more than one such server may be engaged and connected through the network 130. For example, data may be transferred between data records stored at different servers, wherein each server is associated with a particular financial institution. The data may be transferred from a first data record stored at a first server associated with a first financial institution to a second data record stored at a second server associated with a second financial institution.

The computing devices 100, 110 and the server 120 may be in geographically disparate locations. Put differently, the computing device 100, the computing device 110 and the server 120 may be remote from one another.

The computing devices 100, 110 and the server 120 are computer systems. The computing devices 100, 110 may take a variety of forms including, for example, a mobile communication device such as a smartphone, a tablet computer, a wearable computer such as a head-mounted display or smartwatch, a laptop or desktop computer, or a computing device of another type. In certain embodiments, a first user (e.g. a transferor) may operate the transferor computing device 100 to cause the transferor computing device 100 to perform one or more operations consistent with the disclosed embodiments. A second user (e.g. a recipient) may operate the recipient computing device 110 to cause the recipient computing device 110 to perform one or more operations consistent with the disclosed embodiments.

The computing devices 100, 110 are adapted to present graphical user interfaces that allow for communication with the server 120. For example, the transferor computing device 100 may be adapted to send, to the server 120, a transfer instruction for transfer of data from a first data record associated with the transferor to a second data record associated with a recipient. The transfer instruction may include a transfer amount and a condition associated with the transfer. The recipient computing device 110 may be adapted to receive, from the server 120, a notification of the transfer instruction. The notification may include a request for permission to obtain contextual data from the recipient computing device 110. The recipient computing device 110 may provide, to the server 120, contextual data therefrom. The recipient computing device 110 may be adapted to receive, from the server 120, notification that data has been transferred to the second data record associated with the recipient.

As will be described in more detail below, the server 120 may be adapted to receive, from the transferor computing device 100, the transfer instruction. The server 120 may send, to the recipient computing device 110, a notification of the transfer instruction and may request permission to obtain contextual data from the recipient computing device 110. The server 120 may receive contextual data from the recipient computing device 110. The server 120 may determine, based on the contextual data, that a condition associated with the transfer instruction is satisfied and may be adapted to effect transfer of data from the first data record associated with the transferor to the second data record associated with the recipient. Operations associated with the server 120 will be described in greater detail below.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network or the like.

As further explained below, the transferor computing device 100 and the recipient computing device 110 communicate with the server 120 via the network 130 to transfer data from the first data record associated with the transferor to the second data record associated with the recipient.

Figure 2:
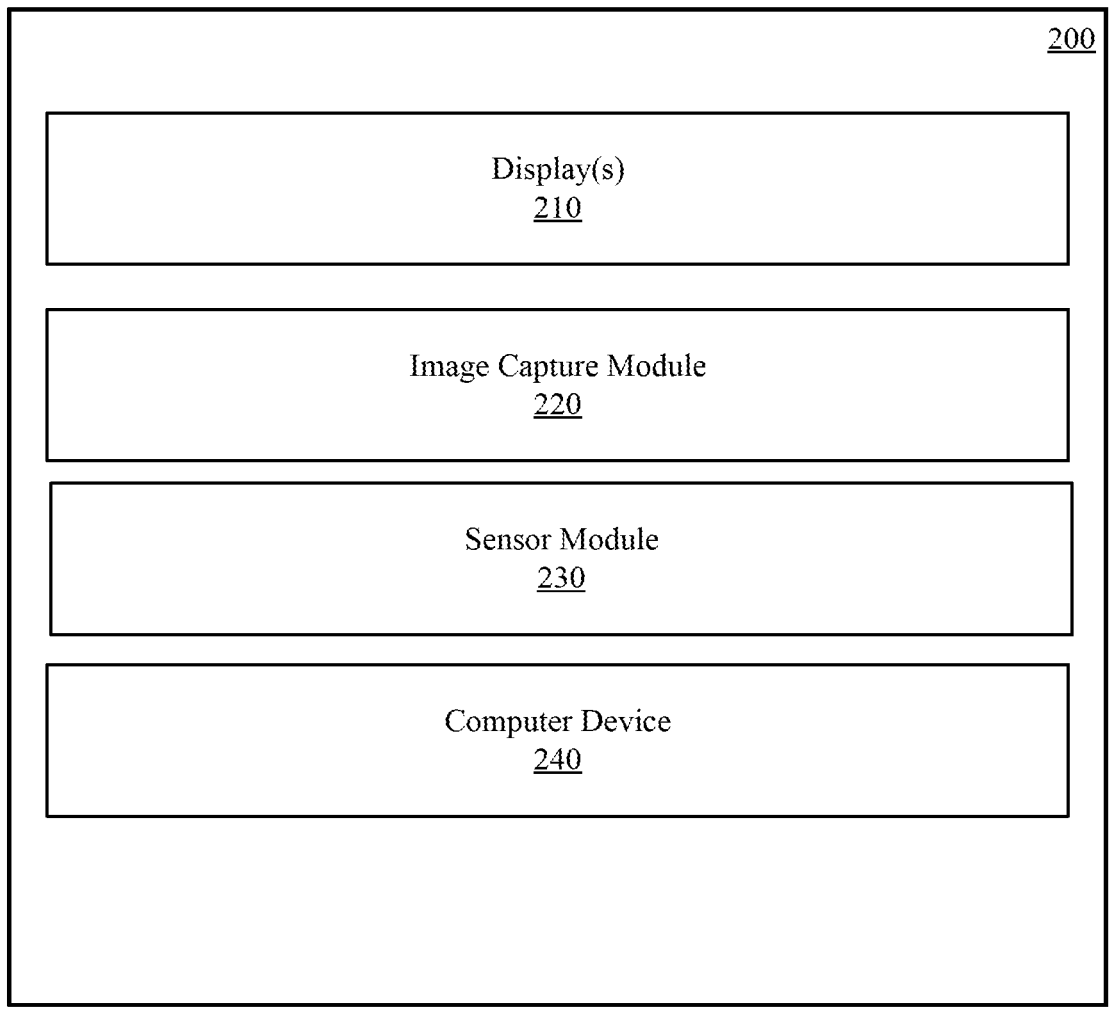
FIG. 2 is a simplified schematic diagram showing components of a computing device.

FIG. 2 is a simplified schematic diagram showing component of an exemplary computing device 200. Computing devices 100 and 110 may be of the same type as computing device 200. The computing device 200 may include modules including, as illustrated, for example, one or more displays 210, an image capture module 220, a sensor module 230, and a computing device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
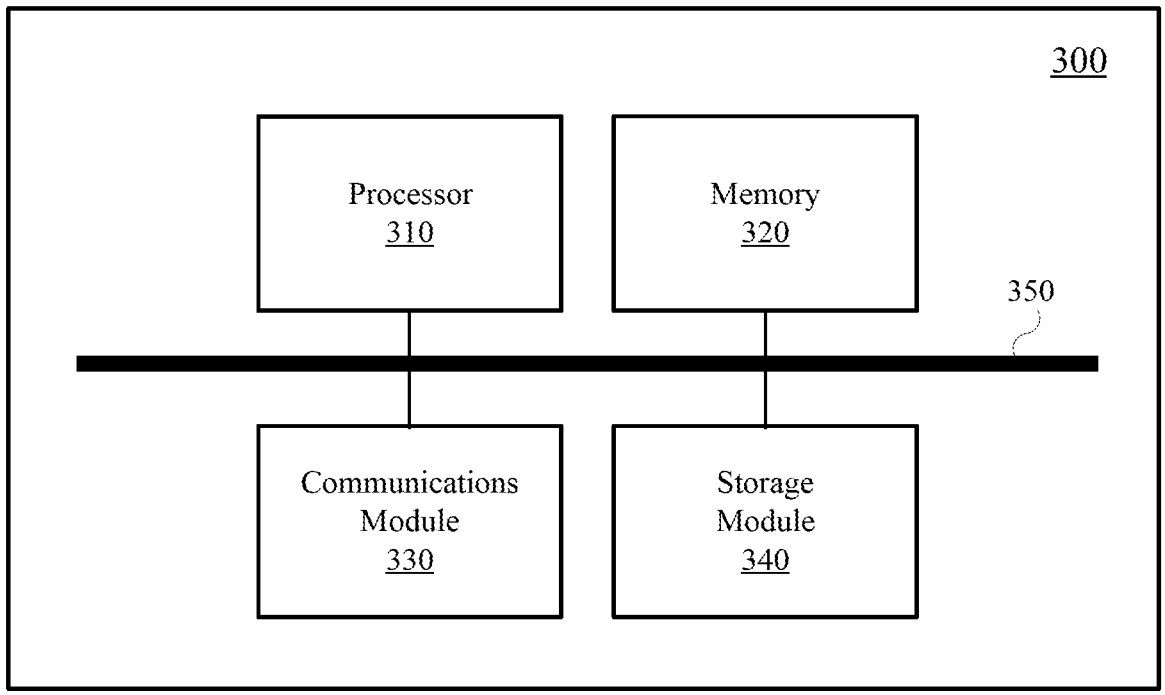
FIG. 3 is a high-level schematic diagram of an example computing device.

Referring now to FIG. 3, a high-level operation diagram of an example computer device 300 is shown. In some embodiments, the computer device 300 may be exemplary of the computer device 240 (FIG. 2) and/or the server 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
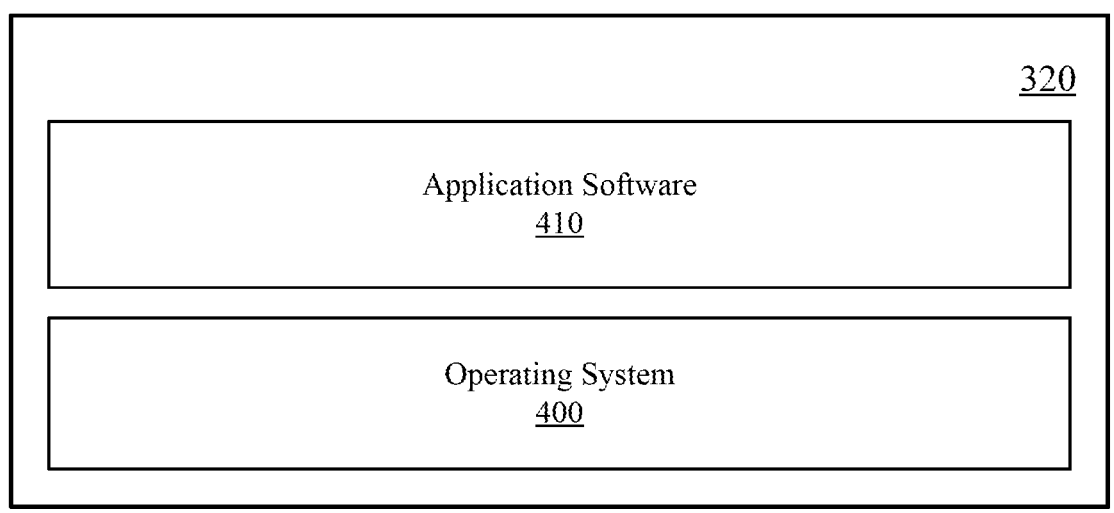
FIG. 4 shows a simplified organization of software components stored in a memory of the example computing device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3).

The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of computing device 100 or 110 (FIG. 1) and/or the server 120 (FIG. 1).

While a single application 410 is illustrated in FIG. 3, in operation the memory 320 may include more than one application 410 and different applications 410 may perform different operations. For example, in at least some embodiments in which the computer system 300 is functioning as one of the computing devices 100, 110 (e.g., as the transferor device or the recipient computing device), the applications 410 may include a data transfer application which may, for example, be a personal banking application. The data transfer application may be configured for secure communications with the server 120 and may provide various banking functions such as, for example, the ability to display a quantum of value in one or more data records (e.g., display balances), configure transfers of data (e.g., bill payments and other transfers), and other account management functions.

By way of further example, in at least some embodiments in which the computer system 300 functions as one of the computing devices 100, 110 (e.g., as the transferor device or the recipient computing device), the applications 410 may include a web browser, which may also be referred to as an Internet browser. In at least some such embodiments, the server 120 may be a web server that may serve one or more of the interfaces described herein. The web server may cooperate with the web browser and may serve an interface when the interface is requested through the web browser. For example, the web server may serve as a mobile banking interface.

By way of further example, in at least some embodiments in which the computer system 300 functions as one of the computing devices 100, 110 (e.g., as the transferor device or the recipient computing device), the applications 410 may include an electronic messaging application. The electronic messaging application may be configured to display a received electronic message such as an email message, short messaging service (SMS) message, or a message of another type. In at least some embodiments, the server 120 may be configured, through computer-executable instructions, to send a message to at least one of the computing devices 100, 120. For example, the server 120 may be configured to send an email message to an address associated with a recipient and an electronic messaging application on a recipient computing device may be configured to retrieve the message and display the message to its recipient. The message may include a link for granting permission to obtain contextual data from the recipient computing device 110.

By way of further example, in at least some embodiments in which the computer system 300 functions as the recipient computing device 110 (e.g., as the transferor device or the recipient computing device), the applications 410 may include an application for communicating contextual data to the server 120. In at least some embodiments, the server 120 may be configured, through computer-executable instructions, to obtain contextual data from the recipient computing device 110 to determine a condition associated with a transfer.

Embodiments of operations performed by the server 120 will now be described. In the following embodiments, data is in the form of a value which may be conditionally transferred from a first data record to a second data record. The first data record is a first account associated with a transferor and the second data record is a second account associated with a recipient.

Figure 5:
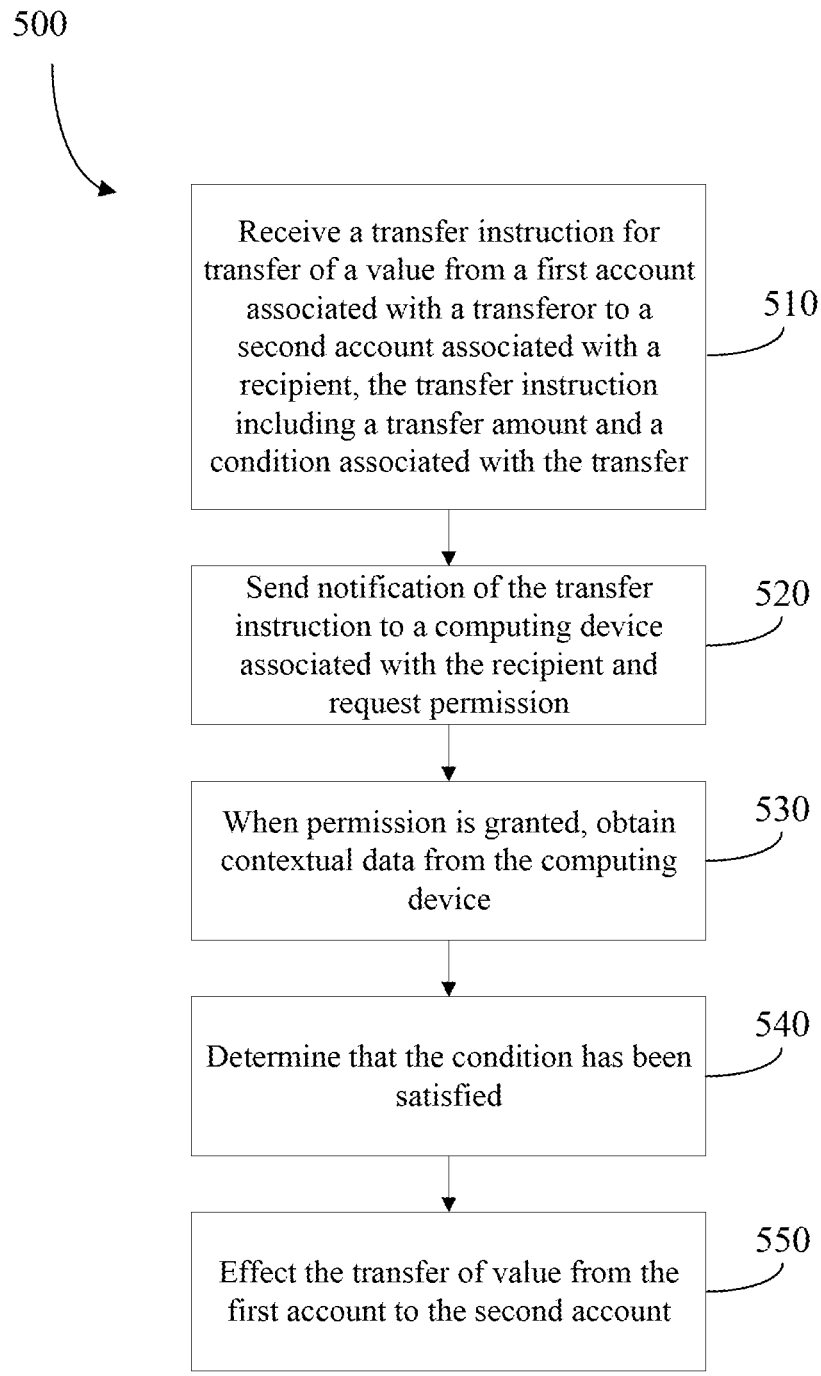
FIG. 5 is a flowchart showing operations performed by a server in conditional transfers of data.

FIG. 5 is a flowchart showing operations performed by the server 120 according to an embodiment. The operations may be included in a method 500 which may be performed by the server 120. For example, computer-executable instructions stored in memory of the server 120 may, when executed by a processor of the server 120, configure the server 120 to perform the method 500 or a portion thereof.

The method 500 begins when the server receives, via the communications module, a transfer instruction for transfer of a value from a first account associated with a transferor to a second account associated with a recipient (step 510). In this embodiment, the transfer instruction includes a transfer amount and a condition associated with the transfer.

Figure 6:
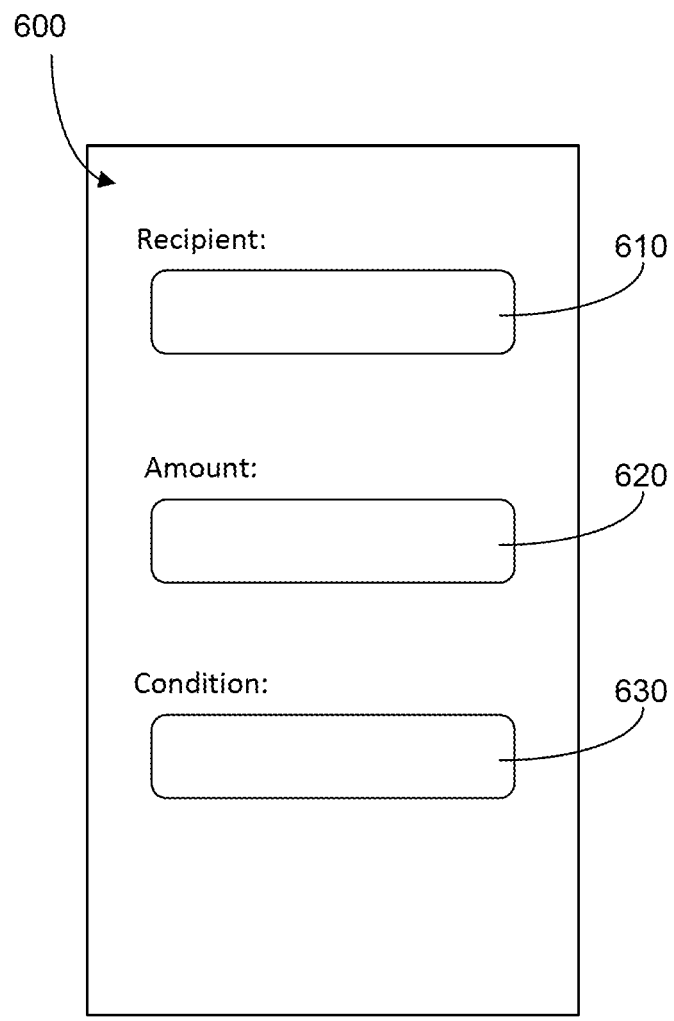
FIG. 6 is an example screen of a graphical user interface

In this embodiment, the transfer amount and the condition associated with the transfer are set by the transferor using a mobile application on the transferor computing device 100. An example is shown in FIG. 6. As can be seen, within the mobile application, a graphical user interface (GUI) 600 is displayed on the transferor computing device 100. The GUI 600 allows for manipulation of one or more input fields via an input interface (such as a keyboard and/or touchscreen) associated with the transferor computing device 100. Touch gestures, for example, may be used to complete each input field. In the example shown in FIG. 6, the GUI 600 includes a first input field 610 which is used to identify the recipient, a second input field 620 which is used to identify a transfer amount, and a third input field 630 which is used to identify a condition associated with the transfer.

The first input field 610 may be linked to a contact list stored on the transferor computing device 100. For example, when the transferor selects the first input field 610, the transferor computing device 100 may display the contact list allowing the transferor to select the recipient therefrom via touch input. Once the recipient is identified, the name and/or username and/or email address and/or phone number of the recipient may be displayed. As another example, the transferor may complete the first input field 610 by entering the recipient's username, phone number and/or email address using a keypad associated with or displayed on the transferor computing device 100.

The second input field 620 may be completed using the input interface associated with the transferor computing device 100. For example, when the transferor selects the second input field 620, the transferor computing device 100 may display a keypad and/or number pad allowing the transferor to enter the amount of value to be transferred, or transfer amount, using touch gestures. The amount of value to be transferred may be for example a dollar amount. The amount of value to be transferred may be conditional based on contextual data obtained from the recipient computing device 110.

The third input field 630 may be completed using the input interface associated with the transferor computing device 100. For example, the mobile application may provide a number of conditions to be selected to complete the third input field 630 based on a predetermined list. The predetermined list may be presented as a drop-down menu. The predetermined list may be generated by a provider of the mobile application. The predetermined list may be generated within the mobile application by the transferor. For example, within the mobile application, the transferor may add a "new condition" for transfer. The new condition may be based on, for example, a particular location. The particular location may be identified by the transferor by inputting a street address for the particular location and by inputting a name for the particular location. For example, within the mobile application, the transferor may enter a new location as "Grandma's House" and may identify the location as "123 Main Street.". The location "Grandma's House" may be within a dropdown list that, when selected by the transferor, may populate the third input field 630.

As another example, the mobile application may provide a number of conditions to be selected to complete the third input field 630 based on a history between the transferor and recipient. For example, the most recent condition used to transfer value from the transferor to the recipient may be used.

As will be described in more detail below, the condition may be based on a particular date (e.g. an anniversary, a birthday, etc.), a particular location (e.g. based on the address or GPS location of a gym or fitness center, a relative's house, a hospital, an animal shelter, etc.), a weather condition, a particular mood, a fitness level, a particular song, a challenge initiated by the transferor, a transaction history of the recipient, an account balance of the recipient, etc. The conditions may be associated with contextual data received from the recipient computing device 110.

Once the transfer instruction is received, the server 120 sends, via the communications module and to the recipient computing device 110, a notification of the transfer instruction and requests permission to obtain contextual data therefrom (step 520). In this embodiment, the server 120 identifies the recipient (e.g. username, phone number, email address, etc.) from the transfer instruction received from the transferor computing device 100 and sends the notification thereto.

The notification may be sent to the recipient computing device 110 as a text message, email message, etc. The notification may additionally or alternatively be communicated to the recipient through a mobile application on the recipient computing device 110. A check may be performed by the server 120 to determine if the recipient computing device 110 has the mobile application installed thereon. If it is determined that the recipient computing device 110 does not have the mobile application installed, a text message may be sent to the recipient computing device 110 notifying the user of the transfer instruction and may provide a selectable link which, when selected, may download the mobile application onto the recipient computing device 110. The selectable link may be linked to, for example, a library of available mobile applications.

Figure 7:
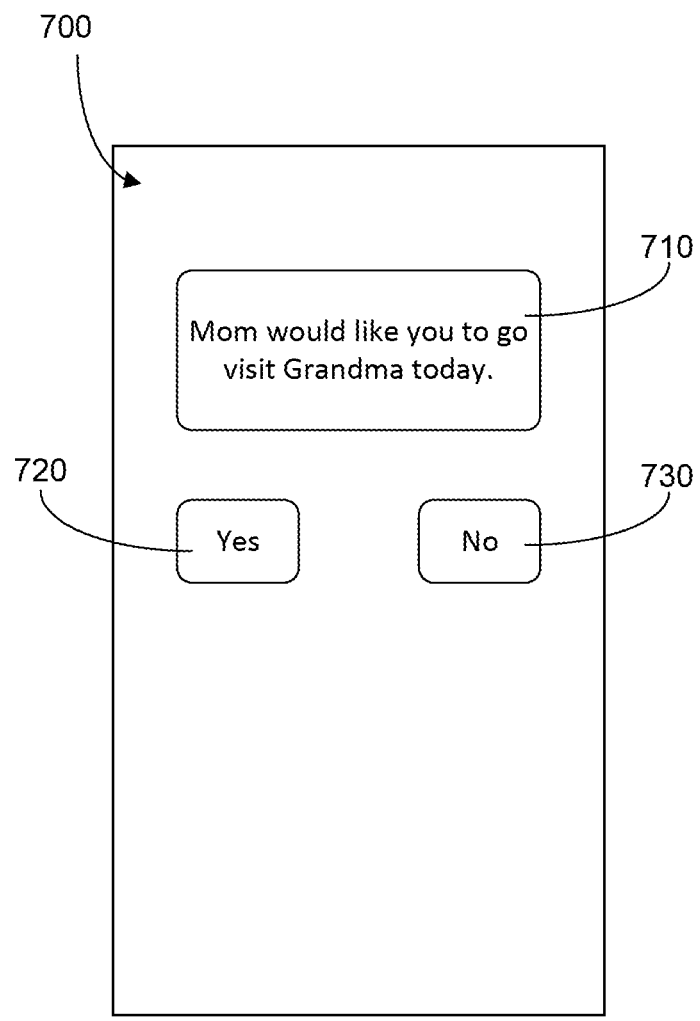
FIG. 7 is an example screen of a graphical user interface.

An example is shown in FIG. 7. As can be seen, within the mobile application, a graphical user interface (GUI) 700 is displayed on the recipient computing device 110. The GUI 700 allows for manipulation of one or more input fields via an input interface (such as a keyboard and/or touchscreen) associated with the recipient computing device 110. In the example shown in FIG. 7, the GUI 700 includes a notification message 710 and selectable options 720 and 730. The notification message 710 is generated based on the condition indicated in the transfer instruction set by the transferor. In this example, the condition is that the transferor ("Mom") would like the recipient (e.g. her "child") to visit Grandma ("Grandma's House"). Selectable option 720, when selected, sends a notification to the server 120 indicating that the recipient will satisfy the condition. In this example, notification that the recipient will satisfy the condition grants permission to the server 120 to obtain contextual data from the recipient computing device 110. Permission may be, for example, granted for a particular time period such as for example until the end of the current day (e.g. midnight) or for twenty-four (24) hours. A notification indicating that contextual data will be obtained from the recipient computing device 110 may be displayed to the recipient. For example, a message may be displayed indicating that "Your location will be tracked until you visit Grandma." The amount of value to be transferred to the recipient may be displayed to the recipient in the notification message, for example, as an incentive for the recipient to satisfy the condition. In another embodiment, since the recipient has the mobile application downloaded on the recipient computing device 110, it may be assumed that the recipient has granted permission to the server 120 to obtain contextual data therefrom and as such the notification may only include a notification message notifying the recipient of the transfer instruction.

Selectable option 730, when selected, sends a notification to the server 120 that the recipient will not satisfy the condition shown in the notification message 710. In this example, notification that the recipient will not satisfy the condition denies permission to the server 120 to obtain contextual data from the recipient computing device 110.

When permission is granted, contextual data is obtained by the server 120 from the recipient computing device (step 530). In this embodiment, the contextual data is based on the condition associated with the transfer. In the example shown in FIG. 7, the condition associated with the transfer is that the transferor ("Mom") would like the recipient ("the child") to travel to a particular location ("visit Grandma") and as such the contextual data is location data. The contextual data may be continuously or periodically sent from the recipient computing device 110 to the server 120.

Figure 8:
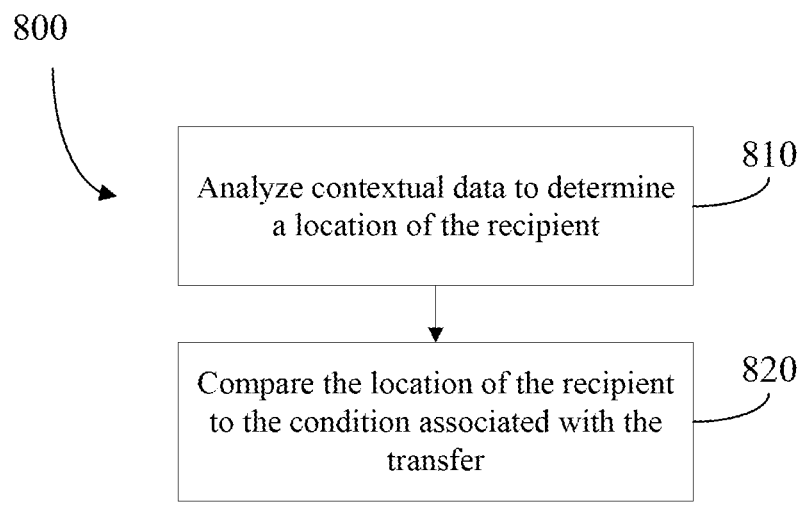
FIG. 8 is a flowchart showing operations performed by a server in determining that a condition is satisfied.

The server 120 analyzes the contextual data to determine that the condition is satisfied (step 540). In this embodiment, the condition is a particular location and the contextual data is in the form of location data. As such, during step 540, operations performed by the server 120 may be included in a method 800 shown in FIG. 8. Computer-executable instructions stored in memory of the server 120 may, when executed by a processor of the server 120, configure the server 120 to perform the method 800 or a portion thereof.

During method 800, the contextual data is analyzed to determine a location of the recipient (step 810). In this embodiment, the location data received from the recipient computing device 110 is analyzed to determine the location of the recipient.

The location of the recipient is compared to the condition associated with the transfer (step 820). In this embodiment, the condition associated with the transfer is a particular location. As such, the server 120 compares the location of the recipient to the particular location to determine whether or not the recipient is at the particular location. In the example shown in FIG. 7, the location of the recipient ("the child") is compared to the particular location ("Grandma's house").

Referring back to FIG. 5, during step 540, when the recipient is at the particular location, the condition is determined to have been satisfied.

Once the condition has been satisfied, the transfer of value is effected from the first account to the second account (step 550). In this embodiment, once the condition is satisfied, the server 120 effects the transfer of value from the first account to the second account. Specifically, server 120 updates the database records such that the transfer amount is debited from the first account and credited to the second account.

Once the transfer of value has been transferred, the transferor and/or recipient may be notified. For example, the server 120 may communicate a notification to the transferor computing device 100 that may display a message to the transferor that "Your Child has visited Grandma and $50 has been deposited into their account." Similarly, the server 120 may communicate a notification to the recipient computing device 110 that may display a message to the recipient that "$50 has been deposited into your account for visiting Grandma."

Although in embodiments described above the condition is described as being based on a location and the contextual data is described as being location data, alternatives are available.

Figure 9:
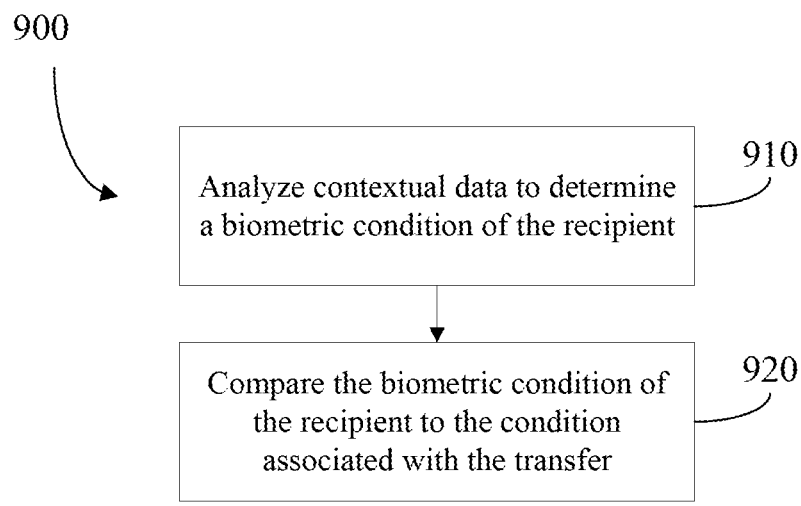
FIG. 9 is a flowchart showing operations performed by a server in determining that a condition is satisfied.

In another embodiment, the condition may be based on biometrics of the recipient. For example, the condition may be based on the recipient exercising (e.g. working out, going for a run, etc.). In this example, the recipient computing device 110 may be in the form of a wearable device such as for example a smart watch. During step 530, contextual data in the form of biometric data may be obtained from the recipient computing device 110. During step 540 of method 500, operations performed by the server 120 may be included in a method 900 shown in FIG. 9. Computer-executable instructions stored in memory of the server 120 may, when executed by a processor of the server 120, configure the server 120 to perform the method 900 or a portion thereof.

During method 900, the biometric data is analyzed to determine if a biometric condition is satisfied (step 910). In this embodiment, the biometric data is analyzed to determine a heart rate of the recipient. It will be appreciated that other biometric data may be obtained and may be analysed to determine, for example, blood pressure, blood sugar level, etc.

The heart rate of the recipient is compared to the condition associated with the transfer (step 920). In this embodiment, the condition associated with the transfer is based on the recipient exercising. As such, the server 120 analyzes the heart rate of the recipient to determine whether or not the recipient has exercised, that is, whether or not the recipient has an elevated heart rate for a particular period of time. When it is determined that the condition has been satisfied, the method continues to step 550 as described above.

Other conditions associated with the transfer may be based on whether or not the recipient has taken their pills. In this example, the biometric data may indicate that the recipient's blood pressure has lowered and it may be assumed that this is a result of the recipient taking their pills or medicine.

Once the transfer of value has been effected (during step 550), the server 120 may continue to receive biometric data from the recipient computing device 110 and may analyze the biometric data to determine if a health status of the recipient has changed. For example, blood pressure of the recipient may be monitored. Upon determining that the recipient's blood pressure has changed, the server 120 may send, via the communications module and to the transferor computing device 100, a notification indicating that the blood pressure of the recipient has changed. For example, the notification may present a message to the transferor stating that "You encouraged Michael to work out and this has lowered his blood pressure!"

In another embodiment, the condition may be based on an account balance for the recipient. For example, the condition may be based on the account balance dropping below a particular level such as for example below $100. During step 530, contextual data in the form of an account balance may be obtained from the recipient computing device 110.

Figure 10:
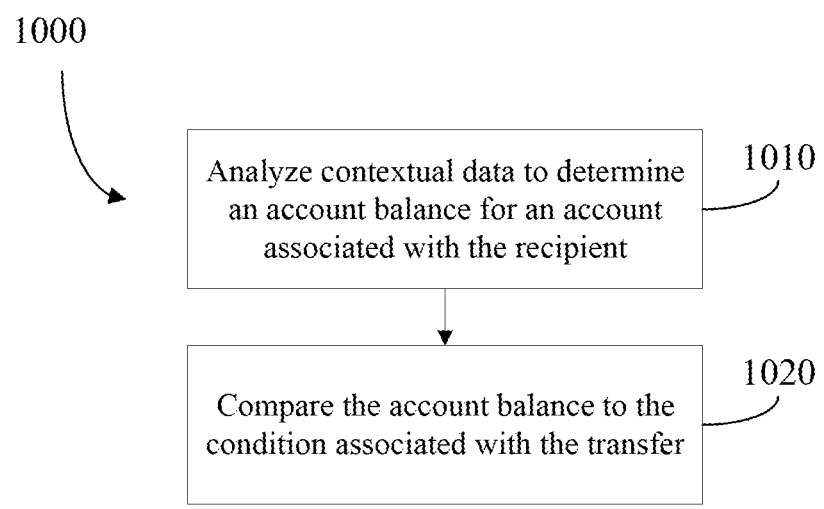
FIG. 10 is a flowchart showing operations performed by a server in determining that a condition is satisfied.

During step 540 of method 500, operations performed by the server 120 may be included in a method 1000 shown in FIG. 10. Computer-executable instructions stored in memory of the server 120 may, when executed by a processor of the server 120, configure the server 120 to perform the method 1000 or a portion thereof. During method 1000, the contextual data is analyzed to determine an account balance for an account associated with the recipient (step 1010).

The account balance of the recipient's account is compared to the condition associated with the transfer (step 1020). The condition associated with the transfer is based on the particular level (e.g. $100). As such, the server 120 determines if the account balance is below $100, and if so, the method continues to step 550 as described above.

It will be appreciated that the server 120 may identify the recipient using information obtained from the first input field 610 and may look up an account balance of the recipient within the database, rather than obtaining the account balance directly from the recipient computing device 110.

In another embodiment, the condition may be based on a transaction history of the recipient. For example, the condition may be based on one or more transactions made by the recipient on a debit card at a particular store. The transfer value amount may be conditional on an amount spent at the particular store and the recipient may be reimbursed by the transferor for the amount spent at the particular store. For example, a parent may wish to automatically reimburse a child for charges made at a grocery store.

Figure 11:
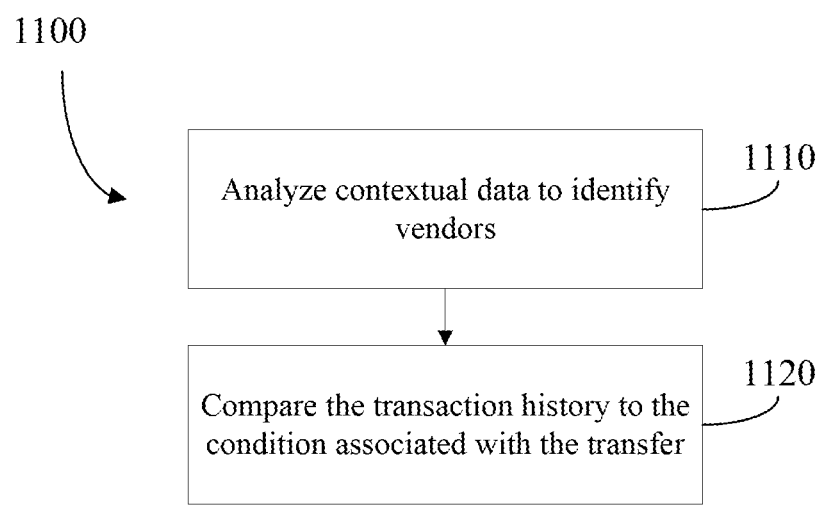
FIG. 11 is a flowchart showing operations performed by a server in determining that a condition is satisfied.

During step 530, contextual data in the form of transaction history data may be obtained from the recipient computing device 110. During step 540 of method 500, operations performed by the server 120 may be included in a method 1100 shown in FIG. 11. Computer-executable instructions stored in memory of the server 120 may, when executed by a processor of the server 120, configure the server 120 to perform the method 1100 or a portion thereof.

During method 1100, the contextual data is analyzed to identify vendors where the debit card was used by the recipient (step 1110).

The vendors are compared to the condition associated with the transfer (step 1120). In this embodiment, the condition associated with the transfer may be whether or not the recipient has bought groceries. As such, the server 120 analyzes the identified vendors to determine if any of the vendors are grocery stores and if so, the method continues to step 550 as described above.

In another embodiment, the condition may be based on a mood of the recipient. For example, a transferor (e.g. a parent) may wish to cheer up the recipient (e.g. a child) if it is determined that the child is unhappy or depressed. The mood of the recipient may be determined by analyzing the contextual data. As will be described, the contextual data may be in the form of microphone data or music data and may be obtained from one or more input devices of the recipient computing device such as for example a microphone and/or from one or more application program interfaces (APIs) stored on the recipient computing device. The API may provide data indicating the mood of the particular song. The API may be associated with a particular streaming music service such as for example Apple™ Music, Google™ Play, Spotify™, etc.

Figure 12:
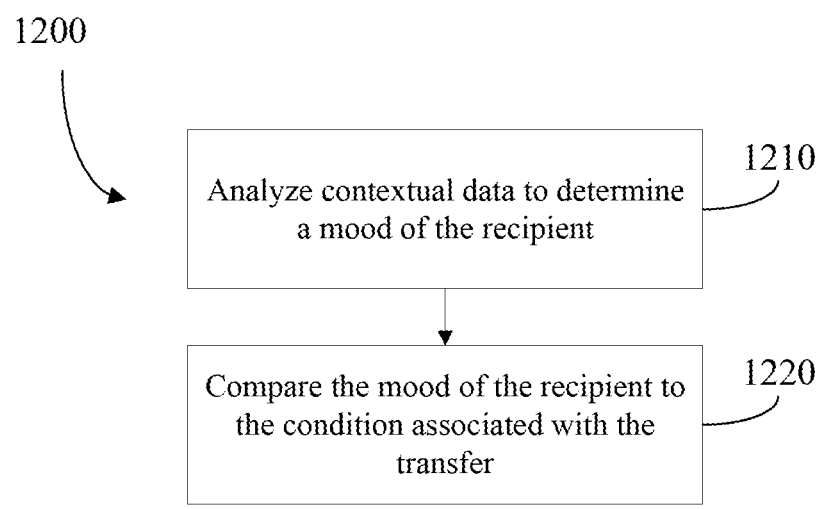
FIG. 12 is a flowchart showing operations performed by a server in determining that a condition is satisfied.

During step 530, contextual data in the form of microphone data or music data may be obtained from the recipient computing device 110. During step 540 of method 500, operations performed by the server 120 may be included in a method 1200 shown in FIG. 12. Computer-executable instructions stored in memory of the server 120 may, when executed by a processor of the server 120, configure the server 120 to perform the method 1200 or a portion thereof.

During method 1200, the contextual data is analyzed to determine a mood of the recipient (step 1210). In this embodiment, the contextual data is in the form of microphone data or music data and as such a song being played on the recipient computing device may be identified by the server 120 and associated with a particular mood. For example, a song having low chords may be identified as a sad song and a song having high chords may be identified as a happy song. As another example, a database of songs or popular songs may be obtained or generated by the server 120 and each song may be labelled as happy or sad. As another example, lyrics of a song may be analyzed to identify the song as happy or sad. A sad song identifies a sad mood of the recipient and a happy song identifies a happy mood of the recipient.

The mood of the recipient is compared to the condition associated with the transfer (step 1220). In this embodiment, the condition associated with the transfer may be whether the recipient is sad. As such, the server 120 compares the mood of the recipient to the condition and if the recipient is sad, the method continues to step 550 as described above.

Once the transfer of value has been effected (during step 550), the server 120 may continue to receive contextual data from the recipient computing device 110 and may analyze the contextual data to determine if the mood of the recipient has changed. For example, the contextual data may indicate that the recipient is now listening to music associated with a happy mood. Upon determining that the recipient's mood has changed, the server 120 may send, via the communications module and to the transferor computing device 100, a notification indicating that the transfer of value has increased the mood of the recipient. For example, the notification may present a message to the transferor stating that "The money you sent Michael has cheered him up!"

Although the mood of the recipient is determined based on a song being played on the recipient computing device 110, the mood of the recipient may be determined in another way. For example, location data may be obtained from the recipient computing device 110 indicating a location thereof. The weather at that location may be determined and if the weather is poor (e.g. rain, snow, etc.), the mood of the recipient may be determined as sad and the condition for the transfer may be satisfied. As will be appreciated, weather data may be obtained directly from an API associated with a weather network on the recipient computing device 110.

As another example, the mood of the recipient may be determined by analyzing messages such as text messages or email messages being sent from the recipient computing device 110. In this example, message data may be obtained from the recipient computing device 110 and may be analyzed to determine the mood of the recipient. For example, if the message data includes words such as "sad", "depressed", "broke up" and/or includes sad or unhappy emoji's, the mood of the recipient may be determined as sad and the condition for the transfer may be satisfied.

As another example, the mood of the recipient may be determined by analyzing speech such as through conversation data or microphone data obtained from a microphone of the recipient computing device 110. In this example, microphone data may be obtained from the recipient computing device 110 and may be analyzed to determine the mood of the recipient. For example, the microphone data may be analyzed to identify words spoken by the recipient. If words such as "sad", "depressed", "broke up" are identified, the mood of the recipient may be determined as sad and the condition for the transfer may be satisfied.

As another example, internet history such as visited web pages and/or search history may be obtained from an API associated with an internet browser on the recipient computing device 110 and may be analyzed to determine the mood of the recipient.

Those skilled in the art that other moods may be identified such as happy, sad, tired, energetic, etc.

In another embodiment, the condition may be based on a particular song being listened to by the recipient. For example, a transferor may want the recipient to listen to a particular song. In this example, the contextual data may be in the form of microphone data or music data and may be obtained from one or more input devices of the recipient computing device such as for example a microphone and/or from APIs stored on the recipient computing device.

Figure 13:
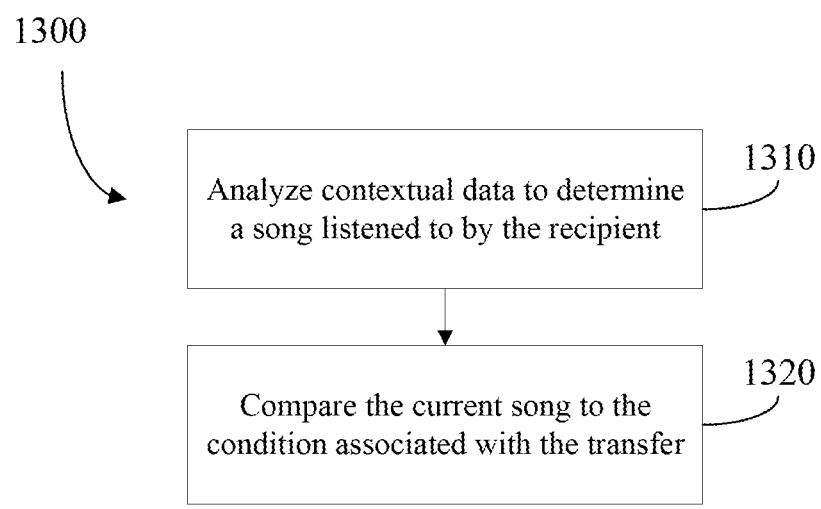
FIG. 13 is a flowchart showing operations performed by a server in determining that a condition is satisfied.

During step 530, contextual data in the form of microphone data or music data may be obtained from the recipient computing device 110. During step 540 of method 500, operations performed by the server 120 may be included in a method 1300 shown in FIG. 13. Computer-executable instructions stored in memory of the server 120 may, when executed by a processor of the server 120, configure the server 120 to perform the method 1300 or a portion thereof.

During method 1300, the contextual data is analyzed to determine a song being played on the recipient computing device 110 (step 1310). In this embodiment, the contextual data is in the form of microphone data or music data and as such a song being played on the recipient computing device may be identified by the server 120.

The song being played on the recipient computing device 110 is compared to the condition associated with the transfer (step 1320). In this embodiment, the condition associated with the transfer is whether or not the recipient is listening to a particular song. As such, the server 120 compares the song being played on the recipient computing device 110 to the particular song and if the song being played is the particular song, the method continues to step 550 as described above.

In another embodiment, the condition may be based on a challenge presented to the recipient from the transferor. For example, the transferor may want the recipient to sing a song to earn the transfer value and this may be indicated in the transfer instruction. The server 120 may send a notification of the challenge with the notification of the transfer instruction (during step 520 of method 500). In this example, the contextual data may be in the form of microphone data and may obtained from one or more input devices of the recipient computing device such as for example a microphone. The contextual data may be analyzed in a manner similar to steps 1310 and 1320 of method 1300. The condition is determined to be satisfied when the recipient has completed the challenge. For example, when the recipient has sung the requested song.

As another example, the transferor may want to notify the recipient that they have been challenged, however they may want to keep the condition of the challenge secret from the recipient. In this example, the server 120 may send a notification of the challenge to the recipient. The condition associated with the transfer may be unknown to the recipient and as such the recipient might have to guess what the challenge is. For example, the challenge might be that the transferor wants the recipient to sing a particular song, but does not want the recipient to know what song. As such, the recipient must guess what song to sing to satisfy the condition.

As mentioned previously, the transfer value may be conditional based on contextual data obtained from the recipient computing device 110. For example, the condition associated with the transfer may that the transferor ("Mom") would like the recipient ("the child") to travel to a particular location ("visit Grandma"). The transfer value may be based on a mode of transportation taken by the recipient to travel to the particular location. The mode of transportation may be, for example, public transit, a vehicle, a taxi, etc.

Figure 14:
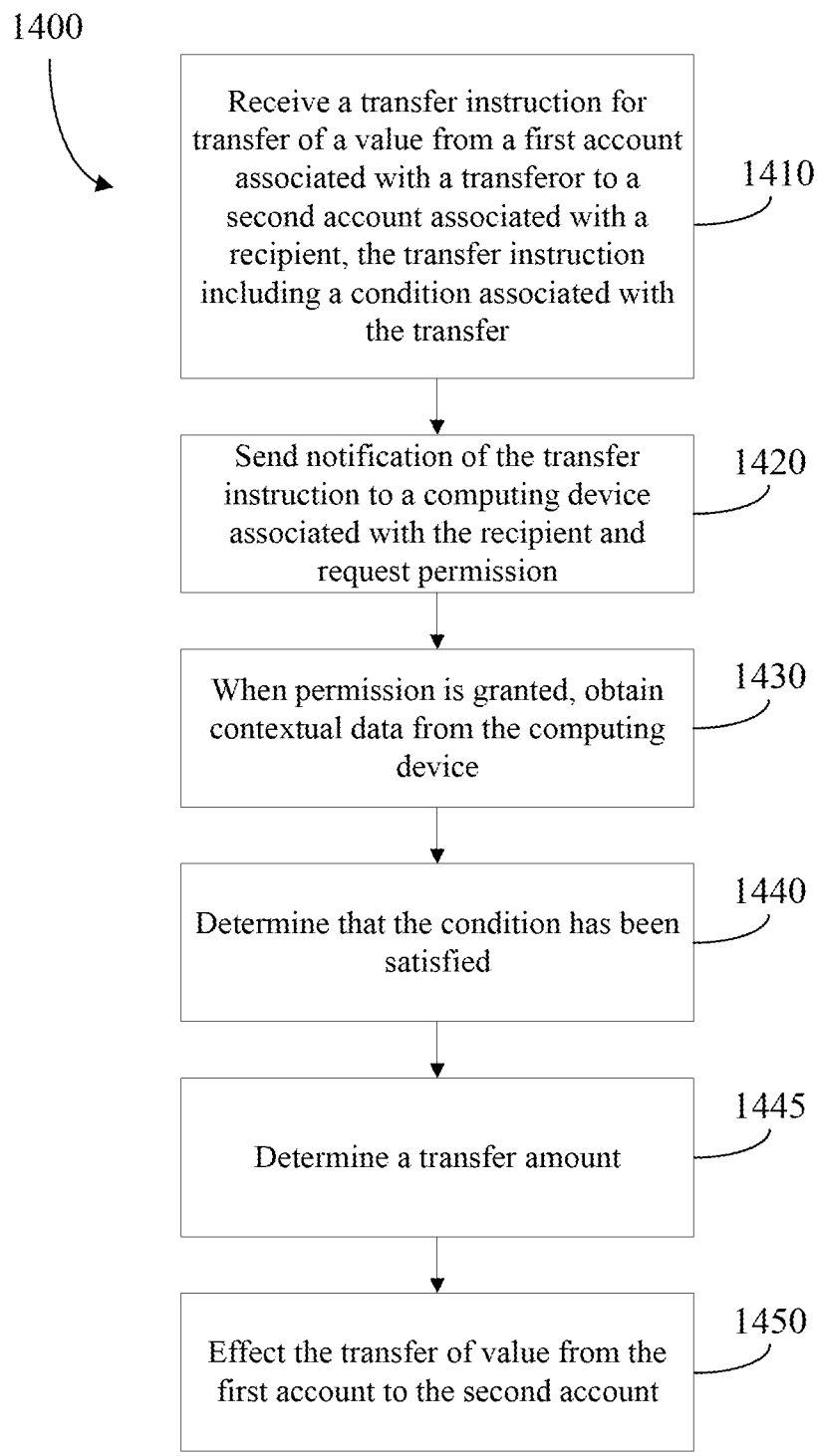
FIG. 14 is a flowchart showing operations performed by a server in conditional transfers of data.

FIG. 14 is a flowchart showing operations performed by the server 120 according to another embodiment. The operations may be included in a method 1400 which may be performed by the server 120. For example, computer-executable instructions stored in memory of the server 120 may, when executed by a processor of the server 120, configure the server 120 to perform the method 1400 or a portion thereof.

The method 1400 begins when the server receives, via the communications module, a transfer instruction for transfer of a value from a first account associated with a transferor to a second account associated with a recipient (step 1410). In this embodiment, the transfer instruction includes a condition associated with the transfer. The transfer instruction, specifically the condition associated with the transfer, may be generated by the transferor in a manner similar to that described above.

Once the transfer instruction is received, the server 120 sends, via the communications module and to the recipient computing device 110, a notification of the transfer instruction and requests permission to obtain contextual data therefrom (step 1420). Step 1420 is similar to step 520 described above.

When permission is granted, contextual data is obtained from the recipient computing device (step 1430). Step 1430 is similar to step 530 described above.

The server 120 analyzes the contextual data to determine that the condition is satisfied (step 1440). Step 1440 is similar to step 540 and may include method 800 as described above. As described above, when the recipient is at the particular location, the condition is determined to have been satisfied.

The transfer amount is determined (step 1445). In this embodiment, the transfer amount is determined based on mode of transportation taken by the recipient. The mode of transportation may be determined by analyzing location data of the recipient obtained from the recipient computing device 110.

Figure 15:
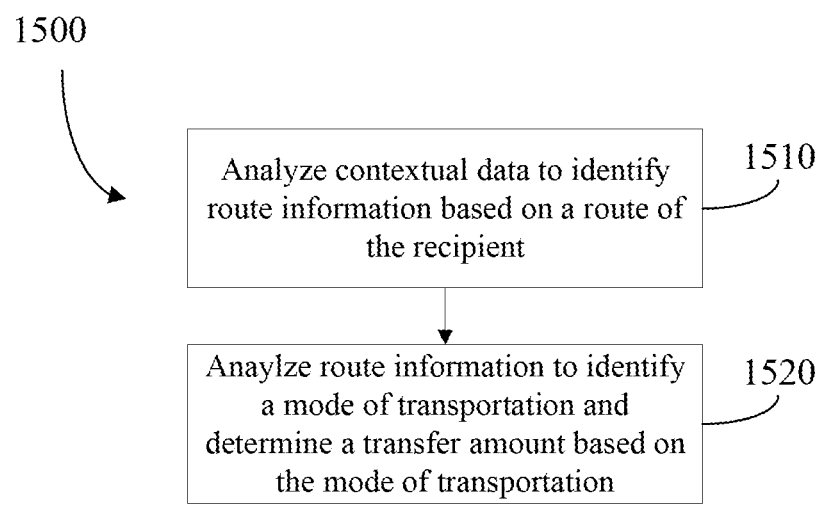
FIG. 15 is a flowchart showing operations performed by a server in determining that a condition is satisfied.

During step 1445 of method 1400, operations performed by the server 120 may be included in a method 1500 shown in FIG. 15. Computer-executable instructions stored in memory of the server 120 may, when executed by a processor of the server 120, configure the server 120 to perform the method 1500 or a portion thereof.

The contextual data is analyzed to identify route information (step 1510). In this embodiment, the contextual data is in the form of location data and the location data is analyzed to determine a starting location for the recipient. The starting location may be a known address for the recipient's residence or office. A travel path may be identified from the starting location to the particular location. Route information may be identified from the location data by tracking the location of the recipient from the starting point to the particular location.

The route information is analyzed to identify a mode of transportation (step 1520). The route information may be compared to a map showing public transit route information. If the route information tracks one or more known public transit routes, it is determined that the mode of transportation is public transit and the transfer amount may be determined to be equivalent to a fare of the public transit system. If the route information does not track one or more known public transit routes, it is determined that the mode of transportation is a vehicle and the transfer amount may be determined to be equivalent to a taxi fare or a dollar amount of gas used by a vehicle. The route information may include a distance travelled by the recipient and/or may include a travel time. Modes of transportation may be a car, a taxi, a ride sharing service, a bus, a train, light rail transit, a streetcar and a trolley.

The transfer of value is effected from the first account to the second account (step 1450). Step 1450 is similar to step 550 described above.

Although the mode of transportation is described as being identified based on route information, those skilled in the art will appreciate that alternatives are available. In another embodiment, the server 120 may have access to an email service on the recipient computing device 110 and may identify a receipt received from a ride sharing service such as for example Uber™ or Lyft™. The transfer amount may be determined based on an amount paid for the ride sharing service.

In another embodiment, the server 120 may send, via the communications module and to the recipient computing device 110, a request to indicate the mode of transportation. For example, the request may cause the recipient computing device 110 to display a message asking "You have travelled to Grandma's house. Please confirm what mode of transportation you took," and may include a number of selectable options such as "I drove," "I took a taxi," and "I took the bus." Once the recipient has selected one of the selectable options, the server 120 may receive a notification of the selection and may determine the transfer amount based on the recipient's selection.

It will be appreciated that the transfer amount may include a reimbursement amount and an additional amount to incentivize the recipient. For example, the recipient may receive reimbursement for a public transit fare an additional $20 as a reward from the transferor.

In another example, the transfer amount may be conditional on an amount of money spent at a particular location. For example, the condition may be set as "buying ice cream" and the transfer amount may be based on how much the recipient has spent at an ice cream store. In this example, the location of the recipient may be tracked (as described above). When it is determined that the recipient has visited a location identified as an "ice cream store," the transaction history of the recipient may be analyzed to determine how much money was spent at the ice cream store. The transfer amount may be set as the amount of money spent at the ice cream store.

Those skilled in the art will appreciate that the condition associated with the transfer may be a combination of those described above. For example, the condition may be set as "buying ice cream on your birthday." The transfer amount may be based on how much the recipient has spent at an ice cream store, however the condition may only be active or available to the recipient on their birthday. In this example, the location of the recipient may be tracked (as described above). When it is determined that the recipient has visited a location identified as an "ice cream store" on a date that corresponds to the recipient's birthday, the transaction history of the recipient may be analyzed to determine how much money was spent at the ice cream store. The transfer amount may be set as the amount of money spent at the ice cream store on the recipient's birthday.

Figure 16:
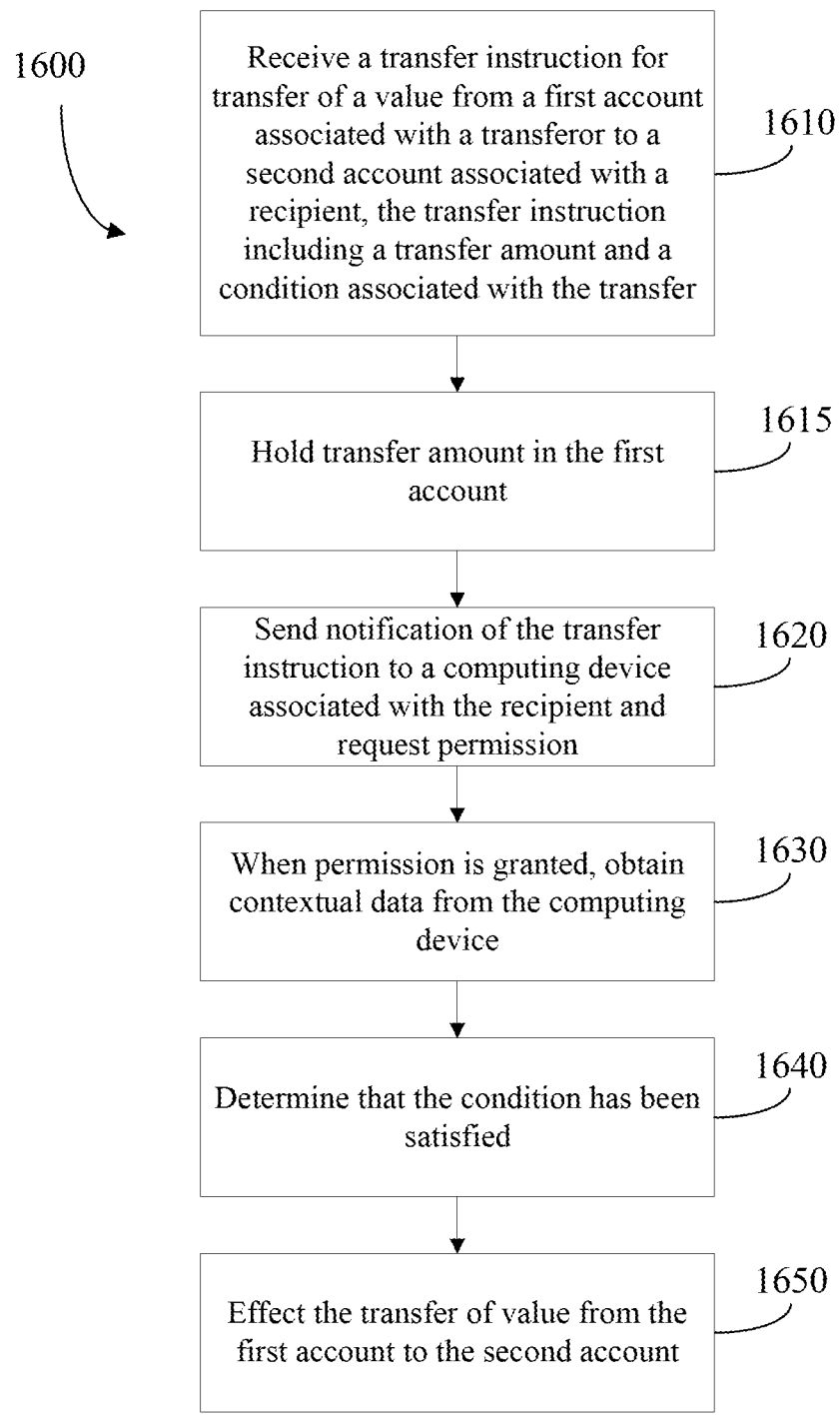
FIG. 16 is a flowchart showing operations performed by a server in conditional transfers of data.

FIG. 16 is a flowchart showing operations performed by the server 120 according to another embodiment. The operations may be included in a method 1600 which may be performed by the server 120. For example, computer-executable instructions stored in memory of the server 120 may, when executed by a processor of the server 120, configure the server 120 to perform the method 1600 or a portion thereof.

Method 1600 is generally identical to method 500 with the following exception. In this embodiment, once the transfer instruction is received from the transferor computing device 100 (step 1610), the server 120 updates the database record of the first account to hold the transfer amount in the first account (step 1615). As such, it is ensured that the transfer amount is available in the first account. The hold may be lifted after a period of time has expired.

In another embodiment, the transfer amount may be transferred, by the server 120, from the first account to a holding account. The transfer amount may be transferred to the second account when the condition is satisfied or may be transferred back to the first account after a period of time has expired and the condition has not been satisfied.

It will be appreciated that in the above embodiments, the condition may be set by the transferor such that it expires at a particular time or after a period of time. For example, the recipient may have 24 hours to satisfy the condition. As another example, the recipient may have one month to satisfy the condition. As another example, the condition may expire at noon on a particular day. As another example, the recipient may have to satisfy the condition on a particular day.

In another embodiment, the transferor and/or the recipient may have more than one computing device associated therewith. For example, the recipient may have a first computing device in the form of a mobile phone and may have a second computing device in the form of a wearable device configured to monitor a heartrate. The first and second computing device may each provide contextual data to the server. Alternatively, the second computing device may provide contextual data to the first device which may, in turn, be communicated to the server.

In another embodiment, contextual data received by the server 120 (from the recipient computing device 110) may be relayed by the server 120 to the transferor computing device 100. For example, if the condition associated with the transfer is that the recipient must sing a particular song, contextual data in the form of microphone data is sent to the server 120 analysis. When it is determined that the condition is satisfied, that is, that the recipient has sung the particular song, the microphone data may be sent to the transferor computing device 100 so the transferor can listen to the song sung by the recipient.

In another embodiment, the condition associated with the transfer may be associated with external factors such as for example an exchange rate. In this embodiment, when the exchange rate becomes favourable, a transfer may be made.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
a communications module;
a processor coupled to the communications module; and
a memory coupled to the processor, the memory storing processor-executable instructions which, when executed by the processor, configure the processor to:
receive, via the communications module, a transfer instruction for transfer of data from a first data record associated with a transferor to a second data record associated with a recipient, the transfer instruction including a transfer amount and a condition associated with the transfer and defined by the transferor within a mobile application;
send, via the communications module, a signal causing a computing device associated with the recipient to display a notification of the transfer instruction and a selectable option that, when selected, grants permission to obtain contextual data therefrom;
when permission is granted, obtain, via the communications module, contextual data from the computing device;
determine, based on the contextual data obtained from the computing device, that the condition associated with the transfer has been satisfied; and
in response to determining that the condition associated with the transfer has been satisfied, effect the transfer of data from the first data record to the second data record.

2. The system of claim 1, wherein the processor-executable instructions, when executed by the processor, further configure the processor to:
hold, within the first data record, the transfer amount until the transfer of data has been effected to the second data record.

3. The system of claim 1, wherein the contextual data includes mood data and the condition specifies a particular mood of the recipient.

4. The system of claim 3, wherein the mood data includes data obtained from an application programming interface (API) associated with a streaming music service, and wherein determining that the condition associated with the transfer has been satisfied includes determining that the recipient has been listening to music associated with the particular mood.

5. The system of claim 1, wherein the contextual data includes location data received from the computing device associated with the recipient.

6. The system of claim 5, wherein the condition specifies a particular location and the condition is satisfied when the location data indicates that the recipient is at the particular location.

7. The system of claim 6, wherein the processor-executable instructions, when executed by the processor, further configure the processor to:
- determine, based on the location data, route information for the recipient; and
- determine the transfer amount based at least on the route information.

8. The system of claim 1, wherein the contextual data includes weather data for a location associated with the recipient.

9. The system of claim 1, wherein the contextual data includes biometric data obtained from the computing device associated with the recipient.

10. The system of claim 1, wherein the condition is based on a balance in the second data record.

11. The system of claim 1, wherein the condition is a challenge set by the transferor.

12. The system of claim 1, wherein the transfer instruction includes a second condition and a second transfer amount and wherein the amount of transfer value depends on which of the conditions is satisfied.

13. The system of claim 1 wherein permission is granted when a mobile application is identified on the computing device associated with the recipient.

14. A method comprising:
- receiving, via a communications module, a transfer instruction for transfer of data from a first data record associated with a transferor to a second data record associated with a recipient, the transfer instruction including a transfer amount and a condition associated with the transfer and defined by the transferor within a mobile application;
- sending, via the communications module, a signal causing a computing device associated with the recipient to display a notification of the transfer and a selectable option that, when selected, grants permission to obtain contextual data therefrom;
- when permission is granted, obtaining, via the communications module, contextual data from the computing device;
- determining, based on the contextual data obtained from the computing device, that the condition associated with the transfer has been satisfied; and
- in response to determining that the condition associated with the transfer has been satisfied, effecting the transfer of data from the first data record to the second data record.

15. The method of claim 14, further comprising:
- holding, within the first data record, the transfer amount until the transfer of data has been effected to the second data record.

16. The method of claim 14, wherein the contextual data includes mood data and the condition specifies a particular mood of the recipient.

17. The method of claim 16, wherein the mood data includes data obtained from an application programming interface (API) associated with a streaming music service, and wherein determining that the condition associated with the transfer has been satisfied includes determining that the recipient has been listening to music associated with the particular mood.

18. The method of claim 14, wherein the contextual data includes location data received from the computing device associated with the recipient.

19. The method of claim 14, wherein the transfer instruction includes a second condition and a second transfer amount and wherein the amount of transfer value depends on which of the conditions is satisfied.

20. A non-transitory computer-readable storage medium storing instructions that when executed by a processor of a computer system cause the computing system to:
- receive, via a communications module, a transfer instruction for transfer of data from a first data record associated with a transferor to a second data record with a recipient, the transfer instruction including a transfer amount and a condition associated with the transfer and defined by the transferor within a mobile application;
- send, via the communications module, a signal causing a computing device associated with the recipient to display a notification of the transfer instruction and a selectable option that, when selected, grants permission to obtain contextual data therefrom;
- when permission is granted, obtain, via the communications module, contextual data from the computing device;
- determine, based on the contextual data obtained from the computing device, that the condition associated with the transfer has been satisfied; and
- in response to determining that the condition associated with the transfer has been satisfied, effect the transfer of data from the first data record to the second data record.

\* \* \* \* \*